United States Patent [19]

Iida et al.

[11] Patent Number: 4,660,110

[45] Date of Patent: Apr. 21, 1987

[54] MAGNETIC DISK STORAGE DEVICE WITH SHROUD ENCLOSING DISK ASSEMBLY

[75] Inventors: Muneo Iida; Jyosei Simizu, both of Odawara; Masami Suzuki, Yokohama; Nobuyuki Okamoto, Odawara; Toshinori Kazama, Hiratsuka; Masanobu Honda, Odawara; Jiro Mochida, Yokohama; Seiji Tada; Masayuki Fujii, both of Odawara, all of Japan

[73] Assignee: Hitachi, Ltd., Tokyo, Japan

[21] Appl. No.: 548,515

[22] Filed: Nov. 3, 1983

[30] Foreign Application Priority Data

Nov. 8, 1982 [JP] Japan .................. 57-194732

[51] Int. Cl.[4] .............................. G11B 5/012
[52] U.S. Cl. .......................... 360/98; 360/97
[58] Field of Search ...................... 360/97–99

[56] References Cited

U.S. PATENT DOCUMENTS 3,618,055 11/1971 Van Acker et al. .................. 360/99
4,329,722 5/1982 West ..................... 360/98

FOREIGN PATENT DOCUMENTS 2264029 7/1974 Fed. Rep. of Germany ........ 360/98
2145478 3/1980 Fed. Rep. of Germany .
54-154310 12/1979 Japan ..................... 360/98

OTHER PUBLICATIONS

Elliot et al., "Filter Arrangement for Rigid File Internal Air Circulation," IBM Technical Disclosure Bulletin, vol. 26, No. 2, Jul. 1983, p. 815.

Primary Examiner—John H. Wolf
Assistant Examiner—Matthew J. Bussan
Attorney, Agent, or Firm—Antonelli, Terry & Wands

[57] ABSTRACT

A magnetic disk storage device capable of avoiding the occurrence of vibration of magnetic disks and off-track of magnetic heads with respect to the magnetic disks, including an inner shroud enclosing a disk assembly composed of a multiplicity of magnetic disks stacked in superposed relation with spacers being interposed therebetween and formed at its outer peripheral wall with first ports for inserting access arms therethrough and at its top above a spindle supporting the disk assembly with a second port, a cylindrical filter for removing dust from air flowing through the second port of the inner shroud into the interior thereof, and a dust cover enclosing the inner shroud, actuators and filter. The provision of the inner shroud is conductive to prevention of development of turbulent air flow in the vicinity of the magnetic disks. The inner shroud is further formed at its outer peripheral wall with a multiplicity of small apertures for releasing heat generated in the inner shroud to outside, to thereby avoid thermal off-track of the magnetic heads.

6 Claims, 10 Drawing Figures

MAGNETIC DISK STORAGE DEVICE WITH SHROUD ENCLOSING DISK ASSEMBLY

BACKGROUND OF THE INVENTION

This invention relates to magnetic disk storage devices, and more particularly it is concerned with a magnetic disk storage device capable of avoiding generation of vibration and production of dust in magnetic disks and magnetic heads and off-track of the magnetic heads with respect to the magnetic disks.

In order to increase capacity and improve system throughput, a magnetic disk storage device has in recent years been developed which comprises a multiplicity of magnetic disks stacked in superposed relation, and two actuators arranged symmetrically with respect to a spindle supporting the magnetic disks and having access to the magnetic disks. This type of magnetic disk storage device is described in U.S. Pat. No. 4,190,870, for example.

In this type of magnetic disk storage device, the magnetic disks rotate at high speed or at a speed of rotation in the range between 3000 and 3600 rpm. Thus, currents of air which are large in volume would flow at high speed in a head disk assembly and cause the magnetic disks and magnetic heads to vibrate, thereby adversely affecting operations of recording and reproducing data on and from the magnetic disks by means of the magnetic heads.

Owing to the high speed at which the magnetic disks rotate, windage loss might generate heat in the magnetic disk storage device. The heat thus generated would cause expansions of the magnetic disks each including a base formed of aluminum and tilting of the spindle supporting the magnetic disks, with a result that an error would be made in positioning the magnetic head on a desired track of one of the magnetic disks of the device.

SUMMARY OF THE INVENTION

A first object of this invention is to provide a magnetic disk storage device capable of avoiding the vibration of the magnetic disks and magnetic heads which would be caused by air currents.

A second object is to provide a magnetic disk storage device capable of avoiding the occurrence of thermal off-track of a magnetic head with respect to a magnetic disk which would be caused by changes undergone by the magnetic head and magnetic disk due to heat generated by windage loss in the magnetic disk device.

One of the outstanding characteristics of the invention enabling the aforesaid objects to be accomplished is that the magnetic disk storage device provided by the invention comprises an inner shroud including a cylindrical outer peripheral wall enclosing a disk assembly composed of a multiplicity of magnetic disks superposed one above another with spacers interposed therebetween while being spaced apart a predetermined distance from an outer edge of the disk assembly, an upper cover providing a cover to a top surface of the cylindrical outer peripheral wall and a lower cover providing a cover to a bottom surface of the cylindrical outer peripheral wall, the outer peripheral wall being formed with first openings each located in a position corresponding to one of actuators and the upper cover being formed with a second opening located above a spindle, a filter located in the vicinity of the second opening formed in the upper cover of the inner shroud for removing dust from a current of gaseous fluid flowing through the second opening, and a dust cover enclosing the inner shroud, filter and actuators as a unit to prevent dust from entering the disk assembly from outside.

Another outstanding characteristic is that the filter is cylindrical in shape and located between the second opening formed in the upper cover of the inner shroud and the dust cover and that the outer peripheral wall of the inner shroud is formed with a multiplicity of small apertures in positions corresponding to outer edges of the magnetic disks.

DESCRIPTION OF THE PREFERRED EMBODIMENTS

Figure 1:
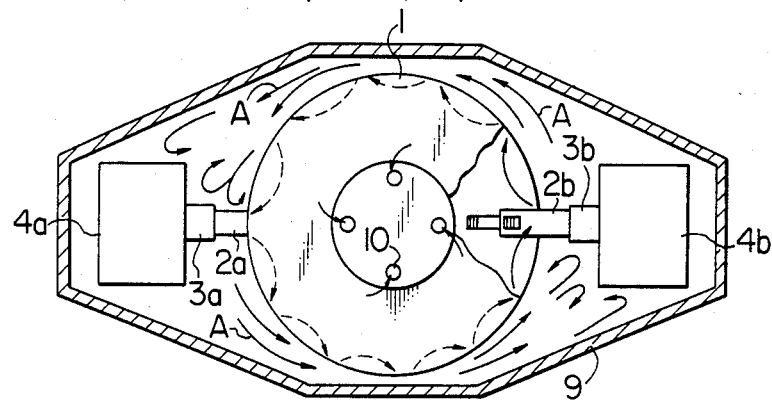
FIG. 1 is a sectional plan view of the magnetic disk storage device of the prior art developed by us.
Figure 2:
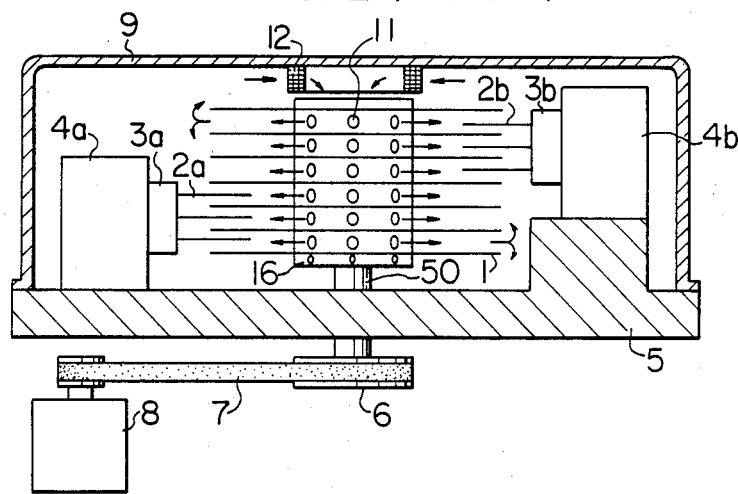
FIG. 2 is a sectional side view of the magnetic disk storage device shown in FIG. 1.

Before describing the embodiments of the invention in detail, a magnetic disk storage device of the prior art will be outlined. FIGS. 1 and 2 show in a sectional plan view and a sectional side view, respectively, the magnetic disk storage device invented previously by us. As shown, the magnetic disk storage device comprises a multiplicity of magnetic disks 1 stacked in superposed relation through spacers 16 on a spindle 50 supported on a base 5, linear actuators 4a and 4b located in diametrically opposed relation to each other with respect to the magnetic disks 1, a motor 8 for driving the magnetic disks 1 for rotation by rotating a pulley 6 connected to a lower end of the spindle 50 through a belt 7, and a dust cover 9 located on the base 5 for enclosing the magnetic disks 1 and linear actuators 4a and 4b as a unit. The linear actuators 4a and 4b include carriages 3a and 3b supporting magnetic heads, not shown, through access arms 2a and 2b, respectively, at end portions so as to move the magnetic heads on surfaces of the magnetic disks 1. An air filter 12 of an annular shape is located in a position of the dust cover 9 above the spindle 50. Each spacer 16 is formed at an outer peripheral portion with a plurality of air exhaust apertures 11 enabling air introduced into the spacer through an upper portion to be discharged therethrough from the spacer when the spacers 16 are assembled with the spindle 50. The multiplicity of magnetic disks 1 stacked one above another with the interposed spacers shall be called a disk assembly.

In the magnetic disk storage device of the aforesaid construction, rotation of the motor 8 causes the magnetic disks 1 to rotate, and the magnetic heads supported by the access arms 2a and 2b of the carriages 3a and 3b respectively have acess to the data storing surfaces of the rotating magnetic disks 1 to perform recording and reproducing of data.

Currents of air produced in the dust cover 9 as the magnetic disks 1 rotate will be described. When the magnetic disks 1 rotate at high speed or at a speed in the range between 3000 and 3600 rpm., for example, air flows from the spacers 16 through the air exhaust apertures toward outer marginal portions of the magnetic disks 1 and causes the pressure in the vicinity of central portions of the magnetic disks 1 to drop, so that the air flowing out of the spacers 16 through the air exhaust apertures 11 are drawn by suction through the filter 12 and air suction apertures 10 formed in positions above the spindle 50 into the spacers 16, from which the air is discharged again through the air exhaust openings 11.

As the currents of air flow as described hereinabove, air in the outer marginal portions of the magnetic disks 1 in the dust cover 9 flows, as indicated by arrows A, in the direction of rotation of the magnetic disks 1. When the actuators 4a and 4b are located in diametrically opposed positions with respect to the magnetic disks 1, however, the speed at which the air flows tends to vary on account of the actuators 4a and 4b and the magnetic disks 1 being enclosed as a unit by the dust cover 9, and the air currents tend to flow in turbulent flow due to the existence of the actuators 4a and 4b.

Research conducted by us into the turbulent flow of the air currents in the outer marginal portions of the magnetic disks 1 has revealed that the outer marginal portions of the magnetic disks 1 vibrate vertically. It has been ascertained that when magnetic disks each including a base formed of aluminum of 2 mm thickness are rotated at 3600 rpm., the vertical vibration of the outer marginal portions of the magnetic disks has an amplitude of about 0.1-0.2 mm and aggravates the floating stability of the magnetic heads which float on a film of air formed on a surface of each magnetic disk. The turbulent flow of air directly causes springs of the magnetic heads floating under light load to vibrate, thereby aggravating the floating stability of the magnetic heads. Aggravation of the floating stability of the magnetic heads raises the problem that stable performance of recording and reproducing operations on the magnetic disks by the magnetic heads is far from being achieved.

We have invented a magnetic disk storage device which is free from the vibration of the magnetic disks experienced in the magnetic disk storage device of the prior art shown in FIGS. 1 and 2.

Figure 3:
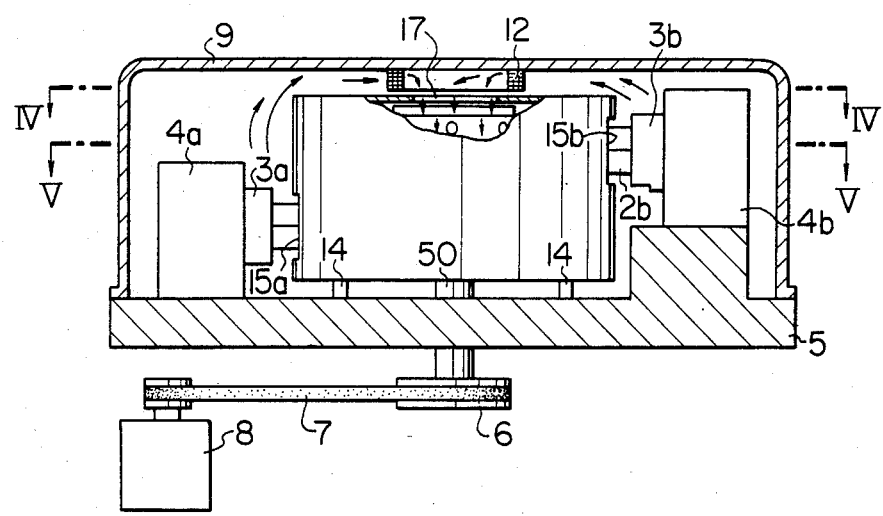
FIG. 3 is a sectional side view of the magnetic disk storage device comprising one embodiment of the invention.
Figure 4:
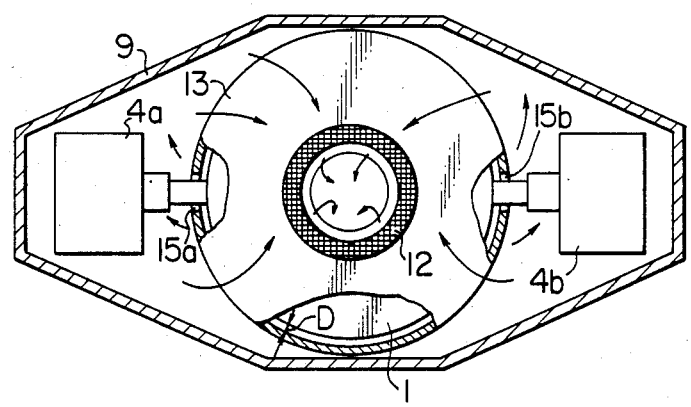
FIG. 4 is a sectional plan view taken in the direction of arrows IV—IV in FIG. 3.
Figure 5:
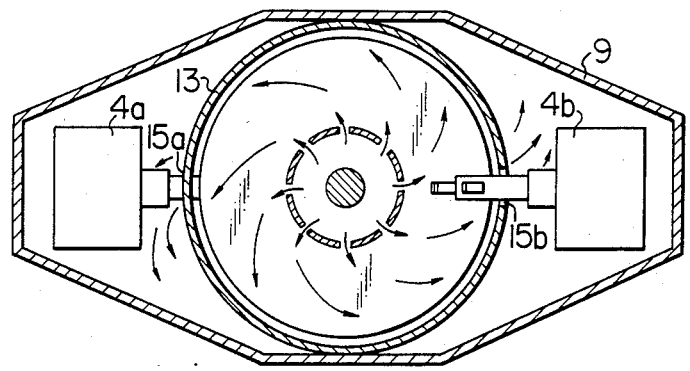
FIG. 5 is a sectional plan view taken in the direction of arrows V—V in FIG. 3.

FIGS. 3-5 show one embodiment of the invention in sectional side and sectional plan views. As shown, the magnetic disk storage device comprises a base 5, a multiplicity of magnetic disks 1 stacked in superposed relation on the base 5 and supported by a spindle 50 with spacers 16 of cylindrical shape formed with apertures being interposed between the magnetic disks 1, a plurality of actuators 4a and 4b located in diametrically opposed positions at different levels with respect to the magnetic disks 1, a motor 8 driving the magnetic disks 1 for rotation by rotating a pulley 6 attached to a lower end of the spindle 50 through a belt 7, an inner shroud 13 enclosing within its cylindrical outer peripheral wall the magnetic disks and spacers which is a characterizing feature of the invention, and a dust cover 9 enclosing the inner shroud 13 and actuators 4a and 4b as a unit. The inner shroud 13, which is supported on an inner shroud support bed 14 on the base 5, is formed with ports 15a and 15b for inserting access arms 2a and 2b supported on carriages 3a and 3b of the actuators 4a and 4b, respectively, therethrough into the interior of the inner shroud 13, and an air inlet port 17 for introducing air into the interior of the inner shroud 13 through an air cleaning filter 12 of a larger diameter than the air inlet port 17. As shown in FIG. 4, the inner shroud 13 is circular in cross section and its inner wall surface is spaced apart a predetermined distance D from an outer circumferential surface of each magnetic disk 1 except at portions thereof at which the arm inserting ports 15a and 15b are formed. Thus, the inner shroud 13 encloses the multiplicity of magnetic disks 1 and the spacers interposed therebetween, which are supported by the spindle 50 and constitute a disk assembly, substantially in the entirely.

When the magnetic disks 1 of the magnetic disk storage device of the aforesaid construction rotates at high speed in the range between 2400 and 3600 rpm., currents of air generated in the interior of the inner shroud 13 are discharged through the arm inserting ports 15a and 15b on the side of the inner shroud 13 and flow through the air inlet opening 17 formed at a top surface of the inner shroud 13 and via the air cleaning filter 12 into a space in each of the spacers between the magnetic disks 1 in the inner shroud 13.

Currents of air flowing through discharge ports formed at the spacers in the inner shroud 13 flow along an inner wall surface of the inner shroud 13 as shown in FIG. 5 before being discharged to the outside through the arm inserting ports 15a and 15b, so that no turbulent flow of air occurs in the interior of the inner shroud 13. The air discharged through the arm inserting ports 15a and 15b impinges on the actuators 14a and 14b and the flow thereof becomes slightly turbulent. However, no influences are exerted by this turbulent flow on the magnetic disks 1 and magnetic heads because it occurs outside the inner shroud 13.

Figure 6:
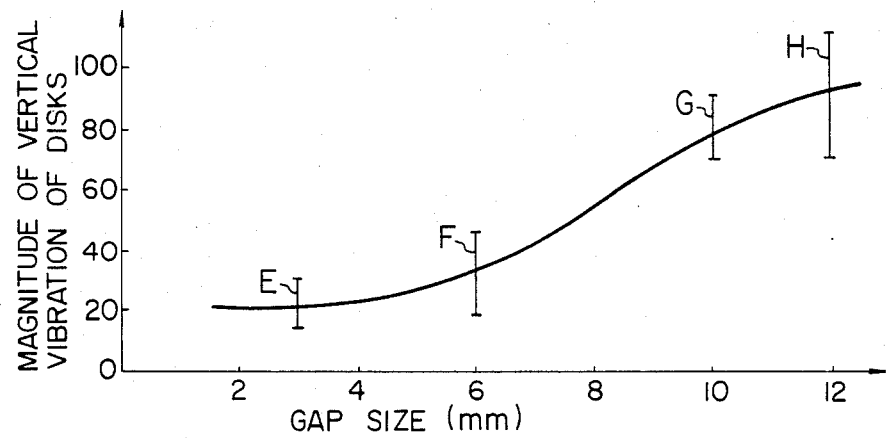
FIG. 6 is a diagram in explanation of the magnitude of vibration of the magnetic disks according to one embodiment of the invention.

FIG. 6 shows the results of experiments conducted on influences which might be exerted by the distance D between the inner wall surface of the inner shroud 13 and the outer circumferential surface of each magnetic disk 1 to study whether changes in the distance D might affect the development of vibration in the magnetic disks 1. It will be clearly seen in the figure that when the distance D is about 12 mm, the amplitude of vertical vibration in one direction has a value H of about $20\mu$ which is relatively great in value, when the distance D is 10 mm, it has a value G of about $10\mu$, when the distance D is 6 mm, it has a value F of about $15\mu$, and when the distance D is less than 3 mm, it has a value E of about $8\mu$. Thus, by reducing the distance D between the inner wall surface of the inner shroud 13 and the outer circumferential surface of each magnetic disk 1 to a level below 3 mm, it is possible to minimize the vibration of the magnetic disks 1 in the embodiment of the invention shown and described hereinabove.

As can be seen in the embodiment described hereinabove, the air currents inside the dust cover 9 and the air currents inside the inner shroud 13 flow in convection flow through the air cleaning filter 12. This enables the air inside the inner shroud 13 to be kept clean at all times and minimizes the dust which might otherwise invade the most important floating gaps between the magnetic disks 1 and the magnetic heads in which the magnetic heads move in floating movement.

The embodiment of the magnetic disk storage device shown in FIGS. 3 and 4 has achieved the effect of avoiding the development of vibration in the magnetic disks 1. However, further experiments have shown that when rotation of the magnetic disks 1 is initiated, accurate positioning of the magnetic heads with respect to the magnetic disks 1 is unobtainable, that is to say, off-track of the magnetic heads occurs due to thermal expansion of the disks. More specifically, as the magnetic disks 1 are started and begin to rotate, heat is generated by the rotation of the disks 1 and remains in the interior of the inner shroud 13 and causes the magnetic disks 1 to expand, but on the other hand the temperature of the base 5 remains unchanged, so that off-track occurs. After lapse of a certain period of time, the heat is released from the inner shroud 13 through the arm inserting ports 15a and 15b into the dust cover 9. The off-track is reduced in value when the temperature in the dust cover 9 or the temperature of the magnetic heads and magnetic disks 1 in the inner shroud 13 becomes substantially equal to the temperature in the vicinity of the base 5.

The fact that it takes time for the off-track to be reduced in value and to disappear has raised the problem that startup of equipment of a system with which the magnetic disk storage device is associated would lag behind.

Figure 7:
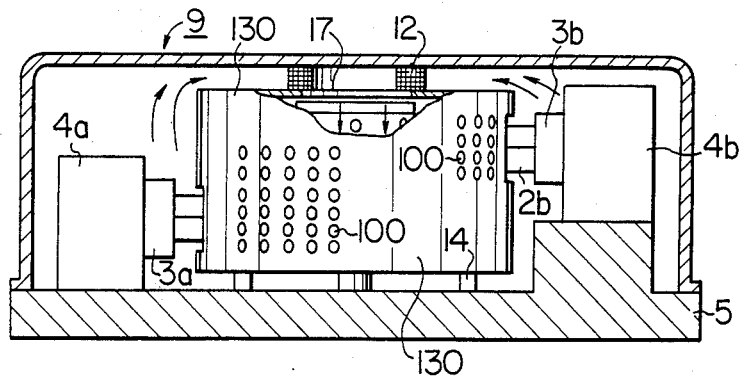
FIG. 7 is a sectional side view of the magnetic disk storage device comprising another embodiment of the invention.

In order to obviate the aforesaid problem, we have developed another embodiment of the magnetic disk storage device in conformity with the invention which has the effect of avoiding thermal off-track. This embodiment will be described by referring to FIG. 7.

The shroud 130 of this embodiment is formed with a multiplicity of small apertures 100 in positions along the outer circumferential surfaces of the magnetic disks 1 and encloses the multiplicity of magnetic disks 1 in their entirety with a clearance of about 3 mm between the inner wall surface of the inner shroud 130 and the outer circumferential surface of each magnetic disk 1. Like the inner shroud 13 shown in FIGS. 3 and 4, the inner shroud 130 is formed with the ports 15a and 15b for inserting the access arms 2a and 2b, respectively, therethrough, and the air inlet port 17 for introducing into the inner shroud 130 clean air admitted through the air cleaning filter 12. The provision of the inner shroud 130 inside the dust cover 9 enables air currents flowing about the magnetic disks 1 as described by referring to FIG. 5 to be regulated by the inner shroud 130 to flow as indicated by solid line arrows in FIG. 7 and causes the air in the inside of the inner shroud 130 to flow in the direction of rotation of the magnetic disks 1. Exchange of air between the inside and outside of the inner shroud 130 is achieved by allowing the air in the inside of the inner shroud 130 to be released therefrom through the ports 15a and 15b for inserting the arms 2a and 2b and the multiplicity of small apertures 100 formed at the wall of the inner shroud 130 and letting clean air introduced into the interior of the inner shroud 130 through the air inlet port 17 via the air cleaning filter 12.

Figure 8:
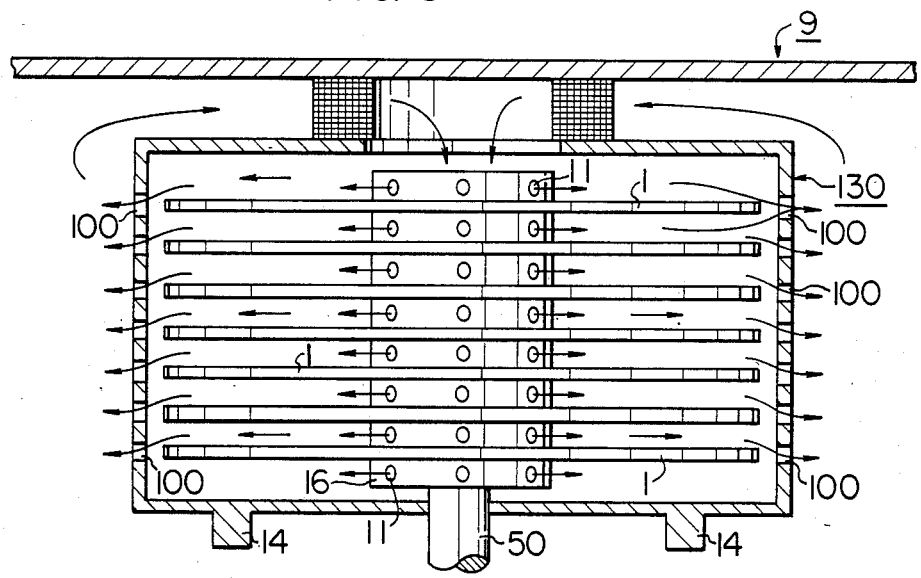
FIG. 8 is a sectional view of the inner shroud of the magnetic disk storage device shown in FIG. 7.

As shown in FIG. 8, the small apertures 100 formed at the wall of the inner shroud 130 are located in positions corresponding to the outer circumferential surfaces or outer edges of the magnetic disks 1 located inside the inner shroud 130. This allows air currents generated by the rotation of the magnetic disks 1 to flow along top surfaces of the magnetic disks 1 and be released through the small apertures 100, so that air currents impinging on the inner wall surface of the inner shroud 130 and rebounding therefrom are very small in volume.

Figure 9:
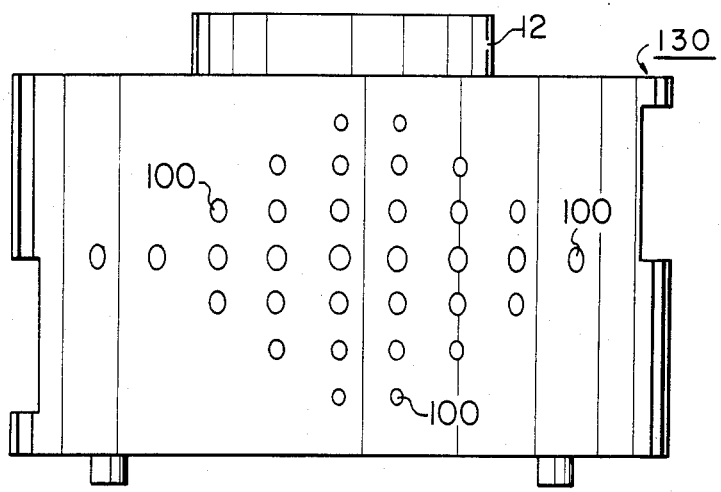
FIG. 9 is a side view of the inner shroud in explanation of a modification of the small apertures formed therein.

Inside the inner shroud 130, the temperature at the intermediate portion is higher than those at higher and lower portions. To release greater amounts of heat from the intermediate portion than from the higher and lower portions in the inner shroud 130, those small apertures 100 which are located at the intermediate portion may have their diameters or numbers increased, as shown in FIG. 9, as compared with those small apertures 100 which are located at the higher and lower portions. The reason why the temperature at the intermediate portion is relatively high is that the heat of the higher and lower portions is also released from the upper and lower covers of the inner shroud 130 as compared with the intermediate portion, so that a greater amount of heat remains in the intermediate portions of the inner shroud 130.

The provision of the multiplicity of small apertures 100 at the wall of the inner shroud 130 enables the thermal off-track to be minimized while greatly reducing the turbulent flow of air. The effects achieved by the provision of the small apertures 100 will be described by referring to FIG. 10.

Figure 10:
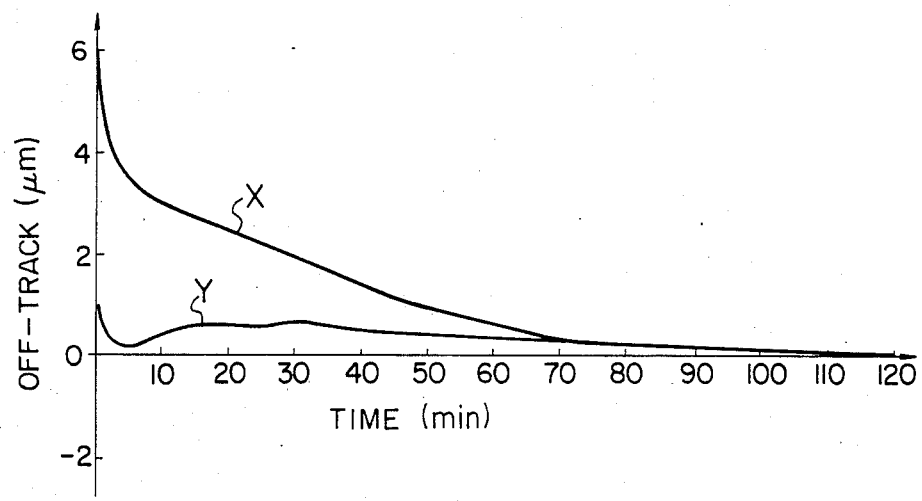
FIG. 10 is a diagram in explanation of the thermal off-track caused by changes in temperature in the embodiment of the magnetic disk storage device shown in FIG. 7.

FIG. 10 is a diagram showing chronological changes in the off-track phenomenon occurring in the magnetic heads with respect to the magnetic disks when the inner shroud is formed with apertures and when the inner shroud is formed with no apertures. In the diagram shown in FIG. 10, a line X represents a chronological change occurring when the inner shroud is formed with no apertures, and a line Y indicates a chronological change occurring when the inner shroud is formed with apertures. It will be clearly seen in the figure that when no apertures are formed, the off-track does not become stable in value until the magnetic disks are driven for rotation for over one hour, and that when the apertures are formed, the value of the off-track falls within an allowable range in several minutes following initiation of rotation of the magnetic disks. This is accounted for by the fact that the heat generated by friction between the air and the surfaces of the magnetic disks during the rotation of the magnetic disks remains inside the inner shroud when no apertures are formed at its wall, and a temperature difference is produced between the inside and the outside the inner shroud, so that it takes time to eliminate the temperature difference by allowing the magnetic disks to rotate. On the other hand, when the inner shroud is formed with the apertures, the heat generated inside the inner shroud is released to the outside through the apertures and the temperature difference is eliminated earlier than when no apertures are formed, thereby enabling the off-track value to become stable in a few minutes.

From the foregoing description, it will be appreciated that the magnetic disk storage device according to the invention comprises an inner shroud for enclosing the disk assembly in its entirety along the outer circumferential surfaces of the magnetic disks and being formed with a multiplicity of small apertures. The provision of such inner shroud makes it possible to achieve the effects of eliminating turbulent flow of air currents and avoiding vibration of the magnetic heads and the magnetic disks and minimizing the off-track phenomenon caused by heat generated by the rotation of the magnetic disks.

In the embodiments shown and described hereinabove, the actuators of the magnetic disk storage device have been shown and described as being of the linear movement type. The invention is not, however, limited to this specific form of actuators and actuators of the rotary type may also be used without departing from the scope of the invention.

What is claimed is:

1. A magnetic disk storage device wherein data is recorded on and reproduced from magnetic disks, driven for rotation, by means of magnetic heads, comprising:
   a disk assembly composed of the magnetic disks stacked in superposed relation with cylindrical spacers interposed therebetween, said disk assembly being supported by a spindle;
   at least one pair of access arms, each access arm supporting one of the magnetic heads for recording and reproducing the data on and from the magnetic disks;
   at least one pair of actuators, each actuator driving one of the pair of access arms for moving the magnetic heads supported on the access arms on surfaces of the magnetic disks;
   an inner shroud including a cylindrical outer peripheral wall enclosing the disk assembly with a predetermined distance between the outer circumferential surfaces of the magnetic disks and an inner surface of the outer peripheral wall, an upper cover providing a cover to a top surface of the cylindrical outer peripheral wall, a lower cover providing a cover to a bottom surface of the cylindrical outer peripheral wall, means delimiting first ports located at the outer peripheral wall in positions corresponding to the pair of actuators, and means delimiting second ports located at the upper cover and opening above the spindle, the inner shroud being formed at its outer peripheral wall with a multiplicity of small apertures maintaining the interior of the inner shroud in fluid communication with the outside of said inner shroud, the multiplicity of small apertures formed at the outer peripheral wall of the inner shroud extending periodically around the entire circumference of the inner shroud and at different elevations of the inner shroud corresponding to the respective disks of the disk assembly, the multiplicity of small apertures being located such that each small aperture has its central point directed against an outer edge of a respective disk of the disk assembly so as to permit air flow therethrough and to reduce turbulent air flow within the inner shroud, the multiplicity of small apertures being arranged such that the apertures which are located at an intermediate elevation have a larger open area than the apertures which are located at high and low elevations with respect to the axis of the spindle, whereby the large open area at the intermediate elevation enable a large amount of air flow therethrough so as to enable release of greater amounts of heat from the intermediate portion of the disk assembly than at the higher and lower portions thereof, thereby enabling thermal off-track to be minimized;
   a filter located in the vicinity of the second port means at the upper cover of the inner shroud for removing dust from air flowing through the second port means; and
   a dust cover enclosing the disk assembly, the access arm, the actuators, the inner shroud and the filter as a unit to avoid the entry of dust form outside.

2. A magnetic disk storage device as claimed in claim 1, wherein said actuators are two in number and arranged symmetrically with respect to the spindle, and wherein said first port means of the inner shroud comprises two ports, each opening in a position corresponding to one of said two actuators.

3. A magnetic disk storage device as claimed in claim 2, wherein said filter is in the form of a cylinder of a larger diameter than the second port means at the upper cover which is fitted between the upper cover and an inner wall surface of the dust cover on a center axis of the spindle.

4. A magnetic disk storage device as claimed in claim 3, wherein said spacers of the disc assembly are formed with a cylindrical wall member having an inside and an outside and each formed with a multiplicity of apertures maintaining the inside and outside of the spacers in communication with each other whereby the air in the spacers can be released through the apertures to the outside as the magnetic disks rotate.

5. A magnetic disk storage device as claimed in claim 4, wherein the predetermined distance between the inner surface of the outer peripheral wall of the inner shroud and the outer circumferential surfaces of the magnetic disks is 3 mm.

6. A magnetic disk storage device as claimed in claim 4, wherein said actuators comprises linear actuators linearly moving the access arms radially of the magnetic disks.

* * * * *